United States Patent Office
2,790,087
Patented Apr. 23, 1957

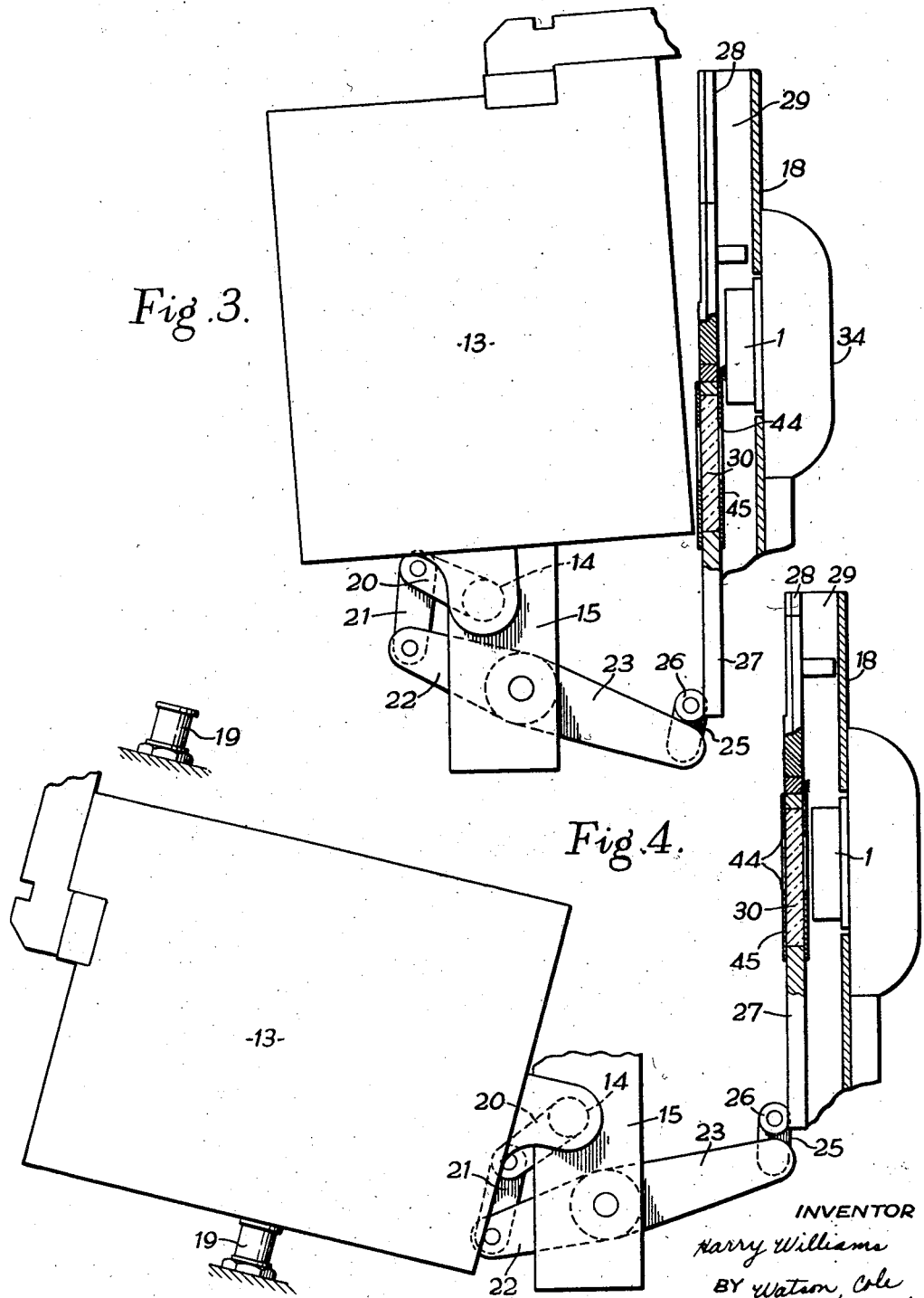

2,790,087

SCREENING DEVICE FOR BETA-RAY SCANNING UNITS

Harry Williams, London, England, assignor to Molins Machine Company, Limited, London, England, a British company Application September 7, 1954, Serial No. 454,249

Claims priority, application Great Britain September 8, 1953

3 Claims. (Cl. 250—105)

This invention concerns a screening device for beta-ray scanning units of the kind described and illustrated in the copending U. S. Serial No. 315,022.

As described in said specification a ray source and an ionisation chamber, referred to hereafter jointly as a beta-ray device, are disposed one at each side of a cigarette rod, the chamber being hinged to the housing containing the ray source, with a clamp for holding the parts together when in operation. This arrangement is provided because it is necessary to open the device from time to time for cleaning and other purposes. In said specification a pivoted shutter is provided as a safety or screening device which moves to cover the ray source when the beta-ray device is opened and the present invention relates to an improved screening device which is particularly necessary with the more powerful ray sources now available.

In accordance with the present invention there is provided a beta-ray device having a screening arrangement comprising two slidable shutters whose neighbouring edges are normally spaced apart for the rays to pass through the space between the edges, one shutter being movable as the beta-ray device is opened, and the other shutter being movable towards the first shutter during said movement, so that the shutters cover the ray source when their edges meet, and mechanism linking the two shutters whereby movement of one shutter caused by the opening of the beta-ray device causes the movement of the other shutter. The said mechanism may comprise a multiplying device (e. g. levers) whereby the movement of the second shutter is more rapid than that of the first to secure rapid closure of the space between the shutters. One shutter may comprise a dense transparent medium such as lead glass to permit inspection of the ray source when the device is opened. The mechanism may be arranged to cause continued movement after the edges of the shutters meet whereby both shutters move together in the same direction.

In a convenient arrangement one shutter carries a pair of levers pivoted to it and coupled by links to the other shutter, fixed cams being provided co-operating with followers on the levers to cause movement thereof.

The invention will be more fully described with reference to the accompanying drawings in which:

Figures 3 and 4 are side elevations, partly in section and of a diagrammatic nature, to show the position of certain parts in two stages during the opening of the beta-ray device.

Figure 1:
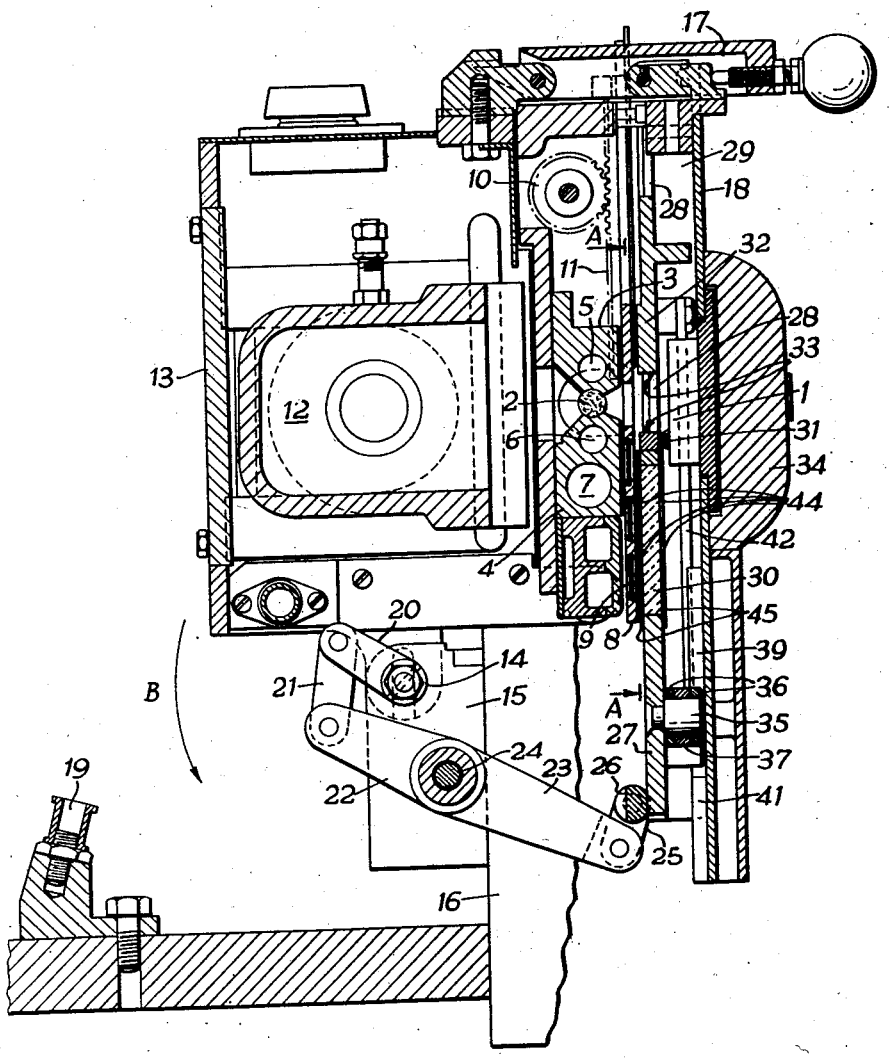
Figure 1 is a sectional side elevation of a beta-ray device comprising an ionisation chamber, ray source, and associated devices.

Referring first to Figure 1 it will be seen that the arrangement is generally similar to that shown in Figure 1 of the specification referred to, save that no adjustment is provided for the ray source 1, and parts appertaining to the present invention are incorporated. Therefore only a brief description of the general construction will be given, together with a detailed description of the novel elements.

The source 1 emits rays which pass through a cigarette rod 2 guided and partly masked by guides 3 and 4. These are arranged, as before, to carry heaters in holes 5 and 6, and a further hole 7 in guide 4 accommodates a thermostat (not shown).

Between source and rod is a slidable screen frame 8, carrying screens, such as 9, whose functions are fully described in the earlier specification, and the frame is shifted up and down by pinions 10 and racks 11. The ionisation chamber is marked 12 and supported in a casing 13 pivoted at 14 to a block 15 fixed to a casting 16 which is part of the cigarette machine. A latch lever 17 holds the casing 13 in the position shown, as the part 18, to which the co-operating part of the latch is fixed, is fixed to the casting 16. When the latch lever is tripped, the casing 13 can swing in the direction of arrow B until it rests on a buffer 19.

To the pivot at 14 is fixed a short lever 20 connected by a link 21 to a doubled-armed lever 22—23, pivoted at 24 on the block 15. The free end of part 23 is coupled by a link 25 to a bar 26 fixed to a slidable plate or shutter 27. This plate, which slides in grooves 28 formed in bars 29 comprises a window 30 of lead glass, and near the upper part of the plate is a brush 31 adapted to wipe the front of the ray source 1, when the plate 27 slides, as described later, to clear the source of dust. Above the plate 27 is a further slidable plate or shutter 32 which co-operates with the plate 27 to provide a space 33 when the beta-ray device is in working condition, and closes with the upper edge of the plate 27 to seal-off the ray source when the chamber-casing is swung back on the pivot 14. On the outer face of the wall of 18 is a substantial slab 34 of metal, which guards the front of the device against radiation from the source.

It will be seen then that when the beta-ray device is in operation, the source is properly closed-up and no appreciable stray radiation can be detected on the exterior.

Figure 2:
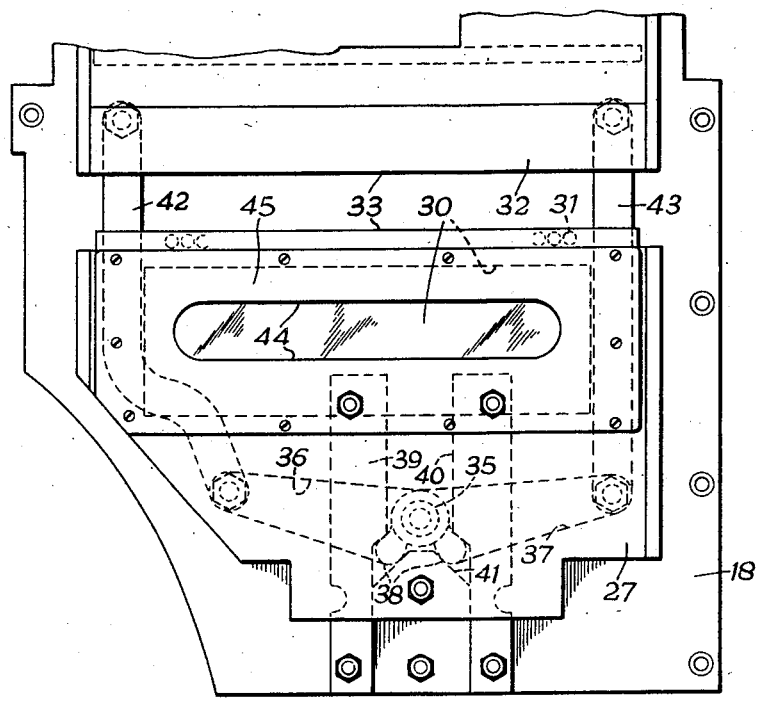
Figure 2 is a front view of a part of Figure 1, looking in the direction of the arrows A.

In order to safeguard the machine operator from any radiation when the ionisation chamber and its casing are swung on the pivot 14, when the latch lever 17 is released, the slidable shutters 27 and 32 are operated, to close, by the following devices best seen in Figure 2:

A pivot pin 35 is fixed to the plate 27, and two levers 36 and 37 are mounted on the pivot. The levers have toes 38 adapted to engage fixed cams 39—40 and 41. These are all fixed to the wall 18. As the casing 13 is swung open, the lever 23 will push the plate 27 upwards and the toes 38 will engage their respective cams 39—40, causing the levers 36 and 37 to swing on the pin 35 so that their free outer ends move downwards. To these ends are connected links 42 and 43 which are also connected to the plate 32. The latter is therefore pulled down as the plate 27 moves up, and the opposed edges rapidly come together and shield the source.

It will be seen from Figure 3 that this closing movement is effected very quickly, for the casing 13 has only moved very slightly from its closed position. The beta-ray device is then safe and further opening can continue without any risk.

Referring now to Figure 4 which shows the casing opened to the full extent, it will be noticed that the lever movement has pushed both shutters upwards so that the lead glass window is over the ray source and this can be inspected in safety. The glass window is held between thin plates 45 provided with apertures 44 defining the actual window opening.

When the casing 13 is closed again the plate 27 is moved downwards and as the toes 38 strike the cam 41 the levers 36—37 swing upwards and the links 42—43 push the plate 32 upwards.

What I claim as my invention and desire to secure by Letters Patent is:

1. A beta-ray device comprising a ray source unit and an ionization chamber unit; means supporting one of said units for pivotal movement from an operative position adjacent the other of said units, in which stray radiation is inhibited, to an inoperative position removed from the other of said units, screening devices comprising a pair of shutters, means supporting said shutters on said source unit for sliding movement toward each other to screen rays from said source unit and away from each other to permit passage of said rays from said source unit to said ionization chamber unit, and mechanism actuated by pivotal movement of one of said units toward and away from the other of said units to effect relative movement of said shutters away from and toward each other, whereby radiation is interrupted in the inoperative position of said units, said mechanism comprising a leverage system connecting the movable one of said units with one of said shutters.

2. A beta-ray device comprising a ray source unit and an ionization chamber unit; means supporting one of said units for pivotal movement from an operative position adjacent the other of said units, in which stray radiation is inhibited, to an inoperative position removed from the other of said units, screening devices comprising a pair of shutters, means supporting said shutters on said source unit for sliding movement toward each other to screen rays from said source unit and away from each other to permit passage of said rays from said source unit to said ionization chamber unit, and mechanism actuated by pivotal movement of one of said units toward and away from the other of said units to effect relative movement of said shutters away from and toward each other, whereby radiation is interrupted in the inoperative position of said units, said mechanism comprising a system of levers and links coupling the movable unit to one shutter to impart thereto a closing movement toward the other shutter as the said unit moves away from the operative position, a lever pivoted on the first shutter and coupled at its free end by a link to the other shutter, a fixed cam, said lever having a cam follower adapted to cooperate with said fixed cam as the first shutter moves in a closing movement, the consequential pivotal movement of the lever causing the second shutter to move toward the first shutter.

3. A beta-ray device comprising a ray source unit and an ionization chamber unit; means supporting one of said units for pivotal movement from an operative position adjacent the other of said units, in which stray radiation is inhibited, to an inoperative position removed from the other of said units, screening devices comprising a pair of shutters, means supporting said shutters on said source unit for sliding movement toward each other to screen rays from said source unit and away from each other to permit passage of said rays from said source unit to said ionization chamber unit, mechanism actuated by pivotal movement of one of said units toward and away from the other of said units to effect relative movement of said shutters away from and toward each other, whereby radiation is interrupted in the inoperative position of said units, said mechanism comprising a system of levers and links coupling the movable unit to one shutter to impart thereto a closing movement toward the other as the said unit moves away from the operative position, a lever pivoted on the first shutter and coupled at its free end by a link to the other shutter, a fixed cam, said lever having a cam follower adapted to cooperate with said fixed cam as the first shutter moves in a closing movement, the consequential pivotal movement of the lever causing said second shutter to move toward said first shutter, said shutters being thereupon displaceable together in the direction of closing movement of the first shutter, and a lead glass window, so mounted on said first shutter as to occupy a screening position in front of said source unit on completion of conjoint displacement of said shutters.

References Cited in the file of this patent

UNITED STATES PATENTS

| 2,462,270 | Lipson | Feb. 22, 1949 |
| 2,492,031 | Blatz et al. | Dec. 20, 1949 |
| 2,687,477 | Pfaff | Aug. 24, 1954 |

FOREIGN PATENTS

| 635,489 | France | Dec. 28, 1927 |